United States Patent
Asai et al.

(10) Patent No.: US 10,944,918 B2
(45) Date of Patent: Mar. 9, 2021

(54) PERIPHERAL DISPLAY DEVICE FOR A VEHICLE

(71) Applicant: TOYOTA JIDOSHA KABUSHIKI KAISHA, Toyota (JP)

(72) Inventors: Goro Asai, Toyota (JP); Yousuke Kubota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/458,839

(22) Filed: Jul. 1, 2019

(65) Prior Publication Data

US 2020/0053295 A1  Feb. 13, 2020

(30) Foreign Application Priority Data

Aug. 10, 2018  (JP) .............................. JP2018-152063

(51) Int. Cl.
| | |
|---|---|
| *H04N 5/265* | (2006.01) |
| *H04N 5/272* | (2006.01) |
| *H04N 5/268* | (2006.01) |
| *B60R 1/00* | (2006.01) |
| *B60R 11/04* | (2006.01) |
| *B60R 11/00* | (2006.01) |

(52) U.S. Cl.
CPC .............. *H04N 5/265* (2013.01); *B60R 1/00* (2013.01); *B60R 11/04* (2013.01); *H04N 5/268* (2013.01); *H04N 5/272* (2013.01); *B60R 2011/004* (2013.01); *B60R 2300/105* (2013.01); *B60R 2300/304* (2013.01); *B60R 2300/8066* (2013.01)

(58) Field of Classification Search
CPC ........ H04N 5/265; H04N 5/268; H04N 5/272; B60R 11/04; B60R 1/00; B60R 2300/105; B60R 2300/304; B60R 2300/8066; B60R 2011/004
See application file for complete search history.

(56) References Cited

U.S. PATENT DOCUMENTS

| | | | |
|---|---|---|---|
| 2009/0079553 A1* | 3/2009 | Yanagi ..................... | B60R 1/00 340/435 |
| 2015/0084755 A1* | 3/2015 | Chen ........................ | G08G 1/16 340/435 |

FOREIGN PATENT DOCUMENTS

JP      2009-081666 A      4/2009

* cited by examiner

*Primary Examiner* — Nam D Pham
(74) *Attorney, Agent, or Firm* — Sughrue Mion, PLLC

(57) ABSTRACT

A rear-facing camera of an electronic mirror device acquires a rear image of an area to the rear of a vehicle, and a left rear-side facing camera and a right rear-side facing camera acquire rear side-images of areas to the rearward sides of the vehicle. An electronic mirror ECU then creates a normal synthesized image by synthesizing the rear image acquired by the rear-facing camera with the rear side-images acquired by the rear-side facing cameras, and then displays the normal synthesized image on a display unit. Additionally, the electronic mirror ECU creates a blind spot priority synthesized image in which the rear side-image that contains an image area corresponding to the object is superimposed onto the rear image, and switches the image displayed on the display unit to this blind spot priority synthesized image.

3 Claims, 13 Drawing Sheets

PERIPHERAL DISPLAY DEVICE FOR A VEHICLE

CROSS-REFERENCE TO RELATED APPLICATION

This application is based on and claims priority under 35 USC 119 from Japanese Patent Application No. 2018-152063 filed on Aug. 10, 2018, the disclosure of which is incorporated by reference herein.

BACKGROUND

Technical Field

The present disclosure relates to a peripheral display device for a vehicle.

Related Art

Technology is described in, for example, Japanese Unexamined Patent Application Laid-Open (JP-A) No. 2009-081666 that determines whether or not a blind spot area that cannot be photographed by a rear camera in a host vehicle is generated at a side of a following vehicle due to the approach of that following vehicle, and if such a blind spot area is generated, that creates a display video image by synthesizing a video image of an area to the rear of the vehicle acquired by the rear camera together with video images of the blind spot area photographed by a right side-camera or a left side-camera, and displays this display video image on a display unit.

In the technology described in JP-A No. 2009-081666, because the image displayed on the display unit is switched each time a blind spot area is generated by the approach of a following vehicle, a sensation of complexity is provoked in a viewer who is viewing the image displayed on the display unit. Moreover, because the image is switched extremely frequently, it is easy for a viewer to misinterpret a situation peripheral to a vehicle such as, for example, mistakenly determining whether or not an object is present in the vehicle periphery, or mistakenly determining the distance to that object.

SUMMARY

The present disclosure provides a peripheral display device for a vehicle that enables a viewer of a display image to recognize a peripheral situation outside a vehicle, while also reducing the frequency with which an image displayed on a display unit is switched.

A peripheral display device for a vehicle according to a first aspect includes a rear-facing image acquisition unit that acquires an image of an area to a rear of a vehicle, rear-side facing image acquisition units that acquire rear side-images of areas to rearward sides of the vehicle, a display control unit that creates a first synthesized image by synthesizing the rear image acquired by the rear-facing image acquisition unit with the rear side-images acquired by the rear-side facing image acquisition units, and then displays the first synthesized image on a display unit, and a switching unit that, when an object is present within an image acquisition range of the rear-side facing image acquisition units and is also within a first blind spot area that does not appear in the first synthesized image, and when, due to an approach of another vehicle from a rear of the vehicle, an object is present within the image acquisition range of the rear-side facing image acquisition units and is also within a second blind spot area that does not appear in the first synthesized image, creates a second synthesized image in which the rear side-image that includes an image area corresponding to the object is superimposed onto the rear image, and switches the image displayed on the display unit to the second synthesized image.

In the first aspect, a rear-facing image acquisition unit acquires an image of an area to the rear of a vehicle, and rear-side facing image acquisition units acquire the rear side-images of areas to the rearward sides of the vehicle. A display control unit creates a first synthesized image by synthesizing the rear image acquired by the rear-facing image acquisition unit with the rear side-images acquired by the rear-side facing image acquisition units, and then displays the first synthesized image on a display unit. Here, if a first blind spot area that does not appear in the first synthesized image is generated within the image acquisition range of the rear-side facing image acquisition units, and another vehicle approaches from the rear of the vehicle, then a second blind spot area that does not appear in the first synthesized image is also generated within the image acquisition range of the rear-side facing image acquisition units. In response to this, if an object is present within the first blind spot area and an object is present within the second blind spot area, then a second synthesized image is created in which the rear side-image that includes an image area corresponding to the object is superimposed onto the rear image, and the image displayed on the display unit is switched to the second synthesized image.

As a result, a second synthesized image in which an image area that corresponds to an object that is present within either the first blind spot area or within the second blind spot area does appear is created and displayed on the display unit. By then viewing the second synthesized image, the viewer of the display image is able to recognize the peripheral situation outside the vehicle, in other words, to recognize a situation in which an object is present either within the first blind spot area or within the second blind spot area. In addition, because the switching of the image displayed on the display unit from the first synthesized image to the second synthesized image is performed when an object is present in either the first blind spot area or in the second blind spot area, the frequency with which the image displayed on the display unit is switched can be reduced. Accordingly, it is possible to inhibit a viewer of the display image from feeling that the switching of the images is too complex, and from misinterpreting the peripheral situation outside the vehicle.

A second aspect is characterized in that, in the first aspect, a portion of the image acquisition ranges of the rear-facing image acquisition unit and the rear-side facing image acquisition units mutually overlap, and the display control unit creates the first synthesized image by firstly deleting the areas of the rear side-images that overlap with the rear image on a virtual projection plane, and then synthesizing the remaining areas of the rear side-images with the rear image.

By employing this type of structure, because the first synthesized image is an image in which the area of the rear image and the areas of the rear side-images are mutually continuous, when viewing the first synthesized image this can be displayed as a close-up image, and when visually confirming the first synthesized image, the viewer can be inhibited from misconstruing the peripheral situation outside the vehicle.

A third aspect is characterized in that, in the first or second aspects, the switching unit creates the second synthesized image in which the image area does appear by either moving a superimposition range or by compressing the rear side-images in the vehicle width direction such that a range of the rear side-images that is superimposed onto the rear image contains the image area.

By employing this type of structure, the creation of the second synthesized image in which an image area corresponding to an object present in either the first blind spot area or the second bind spot area does appear can be achieved without having to either alter the image acquisition direction or the image acquisition magnification of the rear-side facing image acquisition units, so that the structure of the peripheral display device for a vehicle can be prevented from becoming more complex.

A fourth aspect is characterized in that, in any one of the first through third aspects, the switching unit performs the creation of the second synthesized image and the displaying of the second synthesized image on the display unit that are performed when an object is present within the second blind spot area when the object is approaching the vehicle.

By employing this type of structure, by only creating the second synthesized image and displaying this on the display unit when there is a greater possibility of danger, in other words, when the object present within the second blind spot area is approaching the vehicle, it is possible to further reduce the frequency with which the display image is switched to the second synthesized image.

As is described, for example in a fifth aspect, in any one of the first through fourth aspects, it is possible for the peripheral display device for a vehicle to be an electronic mirror device that is mounted on the vehicle.

The present disclosure has the excellent effect of enabling a viewer of a display image to recognize a peripheral situation outside a vehicle, while also reducing the frequency at which an image displayed on a display unit is switched.

BRIEF DESCRIPTION OF THE DRAWINGS

An exemplary embodiment of the present disclosure will be described in detail based on the following figures, wherein.

DETAILED DESCRIPTION

Hereinafter, an example of an exemplary embodiment of the present disclosure will be described in detail with reference to the drawings. A vehicle onboard system 40 shown in FIG. 1 includes a bus 42, and a plurality of electronic control units that each perform mutually different types of control, as well as a plurality of sensor units are each connected to the bus 42. Note that FIG. 1 only shows that portion of the vehicle onboard system 40 that relates to the present disclosure. Each individual electronic control unit includes a CPU, memory, and a non-volatile storage portion, and, hereinafter, is referred to as an ECU. An electronic mirror ECU 22 is included among the plurality of ECU that are connected to the bus 42.

Figure 1:
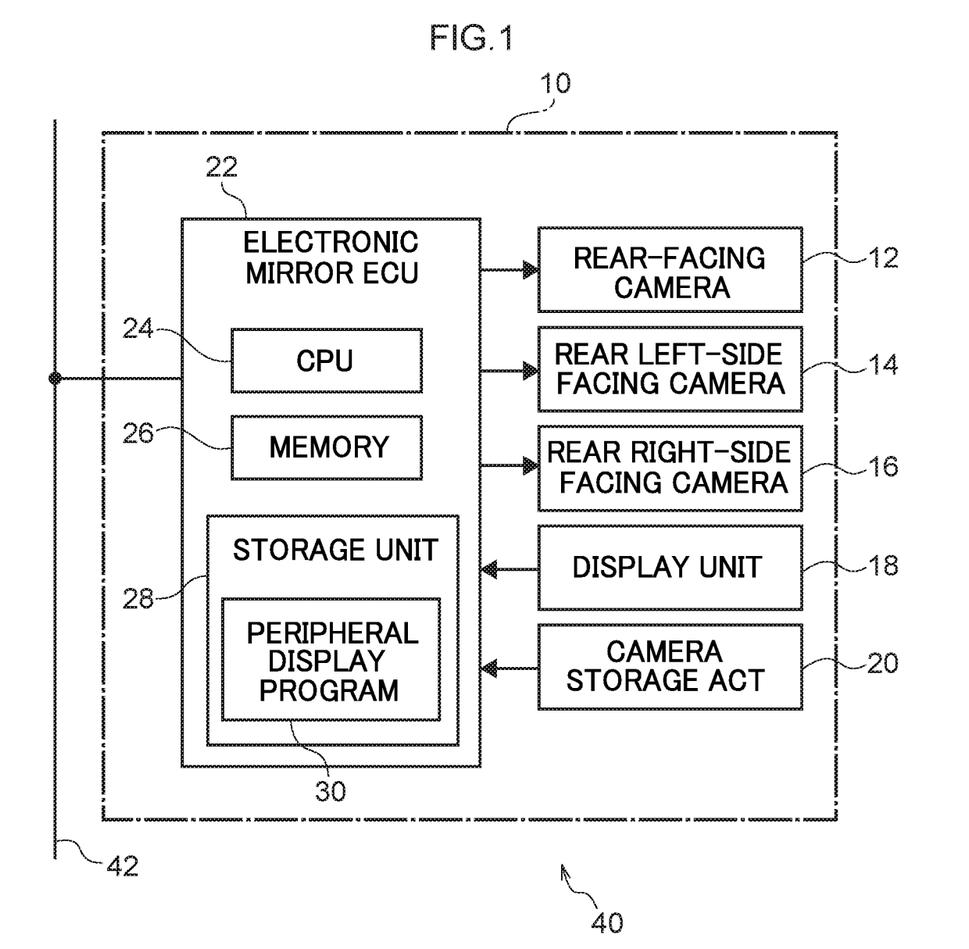
FIG. 1 is a block diagram showing a schematic structure of an electronic mirror device according to an exemplary embodiment of the present disclosure.

A rear-facing camera 12, a rear left-side facing camera 14, a rear right-side facing camera 16, a display unit 18, and a camera storage ACT (Actuator) 20 are each connected to the electronic mirror ECU 22. The electronic mirror ECU 22, the rear left-side facing camera 14, the rear right-side facing camera 16, the display unit 18, and the camera storage ACT 20 together form part of an electronic mirror device 10, and the electronic mirror device 10 serves as an example of a peripheral display device for a vehicle. Note that, of this electronic mirror device 10, the rear-facing camera 12 serves as an example of a rear-facing image acquisition unit, while the rear left-side facing camera 14 and the rear right-side facing camera 16 serve as examples of a rear-side facing image acquisition unit. In addition, the display unit 18 serves as an example of a display unit, and the electronic mirror ECU 22 serves as an example of a display control unit and a switching unit.

The rear-facing camera 12 is placed in a rear portion of a vehicle 50 (see FIG. 4), and an image acquisition optical axis (i.e., a lens) thereof faces towards a rear of the vehicle so as to acquire an image of an area to the rear of the vehicle 50. Note that it is only necessary that the placement position of the rear-facing camera 12 enable the rear-facing camera 12 to acquire an image of an area behind the vehicle 50, and the rear-facing camera 12 may be placed in a rear-end portion (for example, in the vicinity of a rear bumper) of the vehicle 50, or may be placed so as to be able to acquire an image of the area behind the vehicle 50 through the rear windscreen of the vehicle 50. The lens of the rear-facing camera 12 has a fixed focal point, and no mechanism to change the orientation of the image acquisition optical axis thereof is provided so that the image acquisition range of the rear-facing camera 12 is the fixed image acquisition range 60 shown in FIG. 4.

Figure 2:
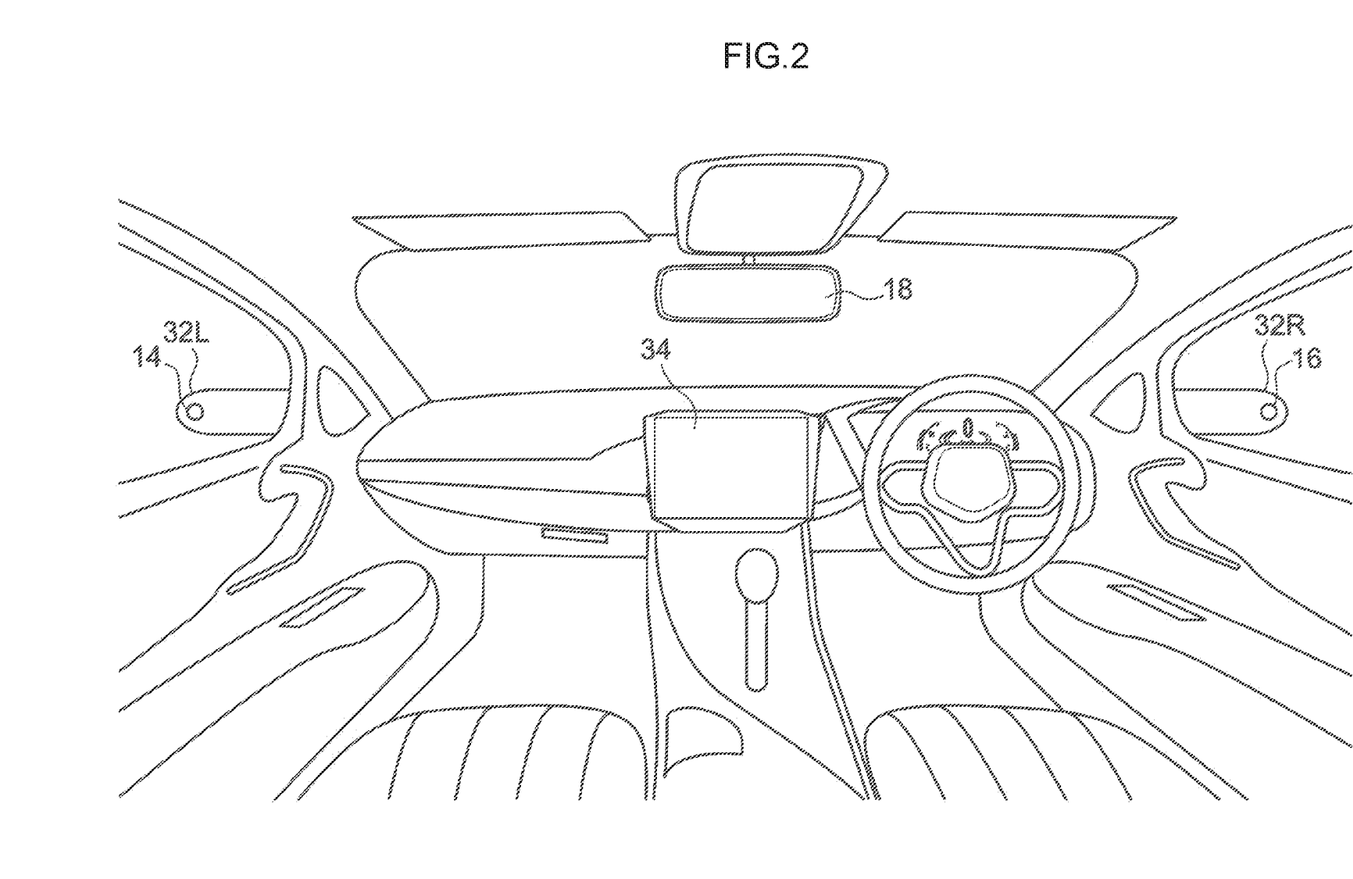
FIG. 2 is a perspective view showing placement positions of rear-side facing cameras and a display unit of an electronic mirror device.

As is shown in FIG. 2, a base portion of a camera supporting body 32L, which is formed in a substantially rectangular parallelepiped shape having a circular arc-shaped distal end portion, is mounted on a vehicle front-side end portion of an intermediate portion in a vehicle up-down direction of a left-side door (i.e., a front-side door: not shown in the drawings) of the vehicle in such a way that the distal end portion of this camera supporting body 32L protrudes towards the vehicle outer side. The rear left-side facing camera 14 is mounted in the vicinity of the distal end portion of the camera supporting body 32L, and the image acquisition optical axis (i.e., the lens) of the rear left-side facing camera 14 faces towards the rear left side of the vehicle so as to acquire an image of an area behind and to the left side of the vehicle. The camera supporting body 32L is able to pivot in the vehicle front-rear direction, and can be pivoted by driving force from the camera storage ACT 20 between a storage position in which the longitudinal direction of the camera supporting body 32L extends substantially along the exterior surface of the vehicle, and a return position in which the rear left-side facing camera 14 acquires an image of the area to the rear left side of the vehicle.

Figure 4:
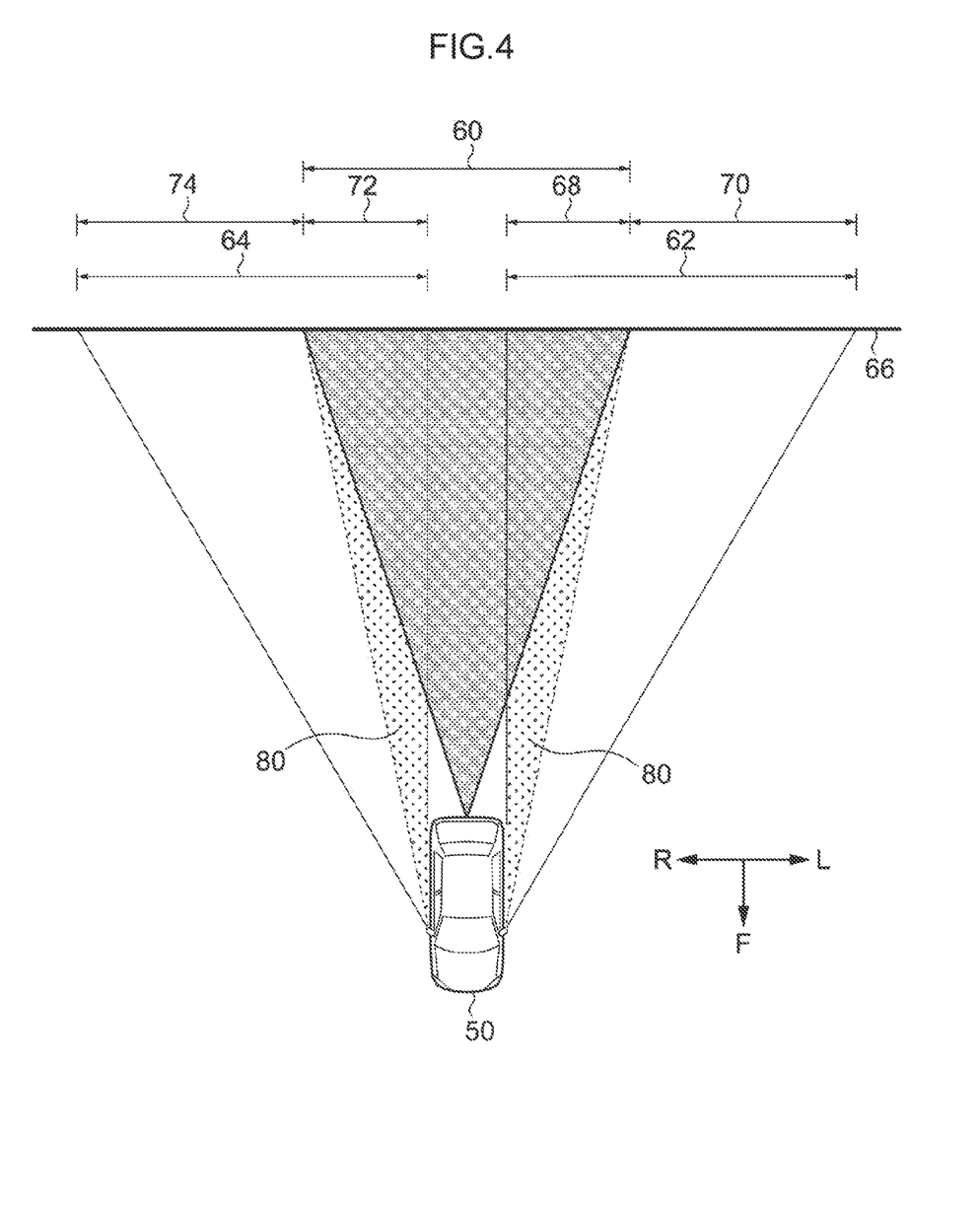
FIG. 4 is a plan view showing an image acquisition range of a camera and a first blind spot area.

The rear left-side facing camera 14 has a fixed focal point, and no mechanism to change the orientation of the image acquisition optical axis thereof is provided so that, when the camera supporting body 32L is in the return position, the rear left-side facing camera 14 acquires an image of a fixed image acquisition range 62 shown in FIG. 4. As is shown in FIG. 4, the fixed image acquisition range 62 of the rear left-side facing camera 14 partially overlaps with the image acquisition range 60 of the rear-side facing camera 12.

In addition, a base portion of a camera supporting body 32R, which is formed having a left-right symmetrical configuration with the camera supporting body 32L, is mounted on a vehicle front-side end portion of an intermediate portion in the vehicle up-down direction of a right-side door (i.e., a front-side door: not shown in the drawings) of the vehicle. The rear right-side facing camera 16 is mounted in the vicinity of the distal end portion of the camera supporting body 32R, and the image acquisition optical axis (i.e., the lens) of the rear right-side facing camera 16 faces towards the rear right side of the vehicle so as to acquire an image of an area behind and to the right side of the vehicle. The camera supporting body 32R is also able to pivot in the vehicle front-rear direction, and can be pivoted by driving force from the camera storage ACT 20 between a storage position in which the longitudinal direction of the camera supporting body 32R extends substantially along the exterior surface of the vehicle, and a return position in which the rear right-side facing camera 16 acquires an image of the area to the rear right side of the vehicle.

The rear right-side facing camera 16 has a fixed focal point, and no mechanism to change the orientation of the image acquisition optical axis thereof is provided so that, when the camera supporting body 32R is in the return position, the rear right-side facing camera 16 acquires an image of a fixed image acquisition range 64 shown in FIG. 4. As is shown in FIG. 4, the fixed image acquisition range 64 of the rear right-side facing camera 16 partially overlaps with the image acquisition range 60 of the rear-side facing camera 12.

Additionally, a central monitor 34 is provided in a central portion of an instrument panel of the vehicle, and a display unit 18 is provided at a separate position on the vehicle upper side from the central monitor 34. An image (hereinafter, referred to as a normal synthesized image or a blind spot priority synthesized image) formed by the electronic mirror ECU 22 synthesizing a rear image (i.e., a video image) acquired by the rear-facing camera 12, with a rear left-side image (i.e., a video image) acquired by the rear left-side camera 14, and a rear right-side image (i.e., a video image) acquired by the rear right-side camera 16 is displayed on the display unit 18.

As is shown in FIG. 1, the electronic mirror ECU 22 includes a CPU 24, memory 26, and a non-volatile storage unit 28, and a peripheral display program 30 is stored in the storage unit 28. As a result of the peripheral display program 30 being read from the storage unit 28 and expanded in the memory 26, and the peripheral display program 30 that has been expanded in the memory 26 then being executed by the CPU 24, the electronic mirror ECU 22 is able to perform peripheral display processing (described below).

Figure 3:
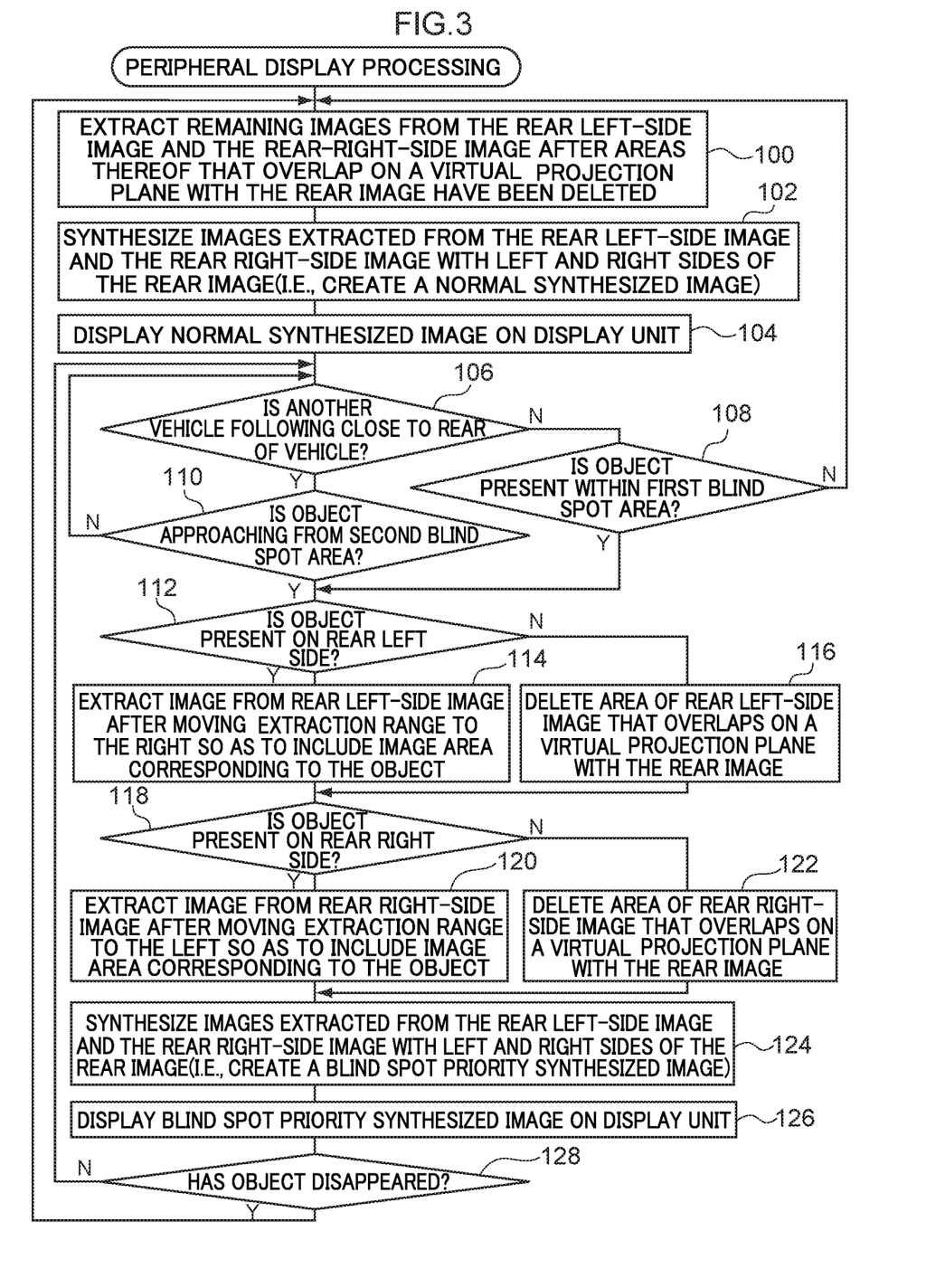
FIG. 3 is a flowchart showing peripheral display processing executed by an electronic mirror ECU.

Next, the peripheral display processing executed by the electronic mirror ECU 22 will be described with reference to FIG. 3 as an action of the present exemplary embodiment. In steps 100 through 104 of the peripheral display processing, the creation and displaying of a normal synthesized image to be displayed on the display unit 18 in a normal situation are performed.

In other words, in step 100 of the peripheral display processing, the electronic mirror ECU 22 extracts a remaining image after an area of the rear left-side image acquired by the rear left-side facing camera 14 that overlaps on a virtual projection plane 66 (see FIG. 4) with the rear image acquired by the rear-facing camera 12 has been deleted from this rear left-side image. The area of the image acquisition range 62 of the rear left-side image acquired by the rear left-side facing camera 14 that overlaps on the virtual projection plane 66 with the image acquisition range 60 of the rear image acquired by the rear-facing camera 12 is a deletion area 68 shown in FIG. 4. The electronic mirror ECU 22 extracts an image corresponding to an extraction area 70 shown in FIG. 4 by deleting the deletion area 68 from the rear left-side image.

In addition, the electronic mirror ECU 22 extracts an image in which an area that overlaps on the virtual projection plane 66 with the rear image acquired by the rear-facing camera 12 is deleted from the rear right-side image acquired by the rear right-side facing camera 16. The area of the image acquisition range 64 of the rear right-side image acquired by the rear right-side facing camera 16 that overlaps on the virtual projection plane 66 with the image acquisition range 60 of the rear image acquired by the rear-facing camera 12 is a deletion area 72 shown in FIG. 4. The electronic mirror ECU 22 extracts an image corresponding to an extraction area 74 shown in FIG. 4 by deleting the deletion area 72 from the rear right-side image.

Figure 5:
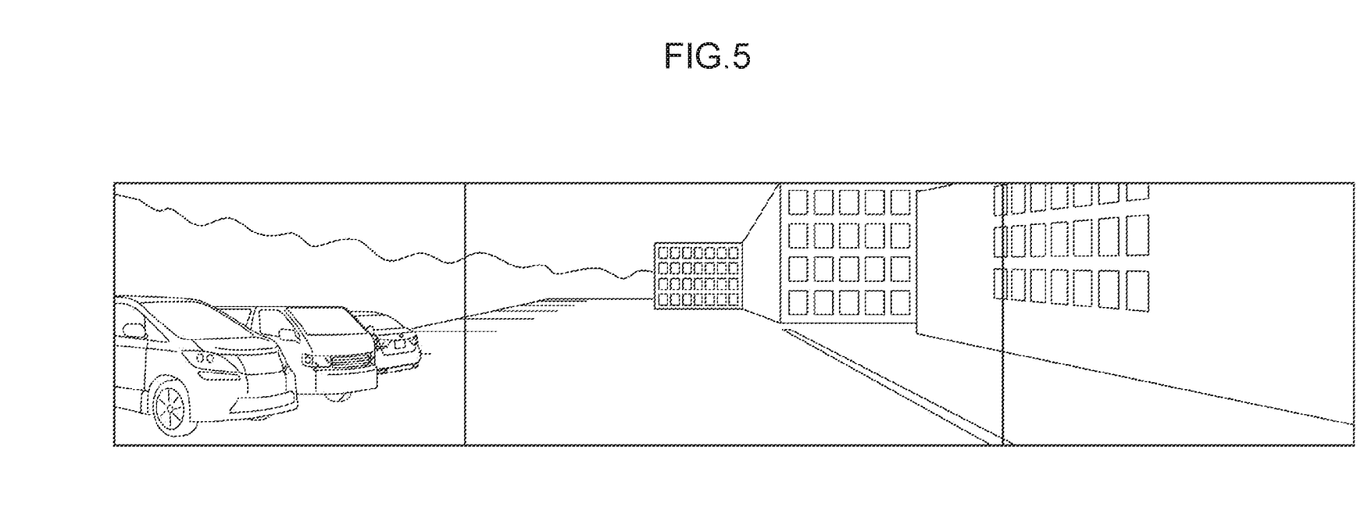
FIG. 5 is an image diagram showing an example of a normal synthesized image.

In the next step 102, the electronic mirror ECU 22 synthesizes the image extracted from the rear left-side image in step 100 with a left side of the rear image, and also synthesizes the image extracted from the rear right-side image in step 100 with a right side of the rear image so as to create a normal synthesized image. Next, in step 104, the electronic mirror ECU 22 causes the normal synthesized image to be displayed on the display unit 18. An example of the normal synthesized image displayed on the display unit 18 is shown in FIG. 5.

The normal synthesized image is created by deleting areas of the rear left-side image and the rear right-side image that overlap on the virtual projection plane 66 with the rear image, and then synthesizing the remaining areas thereof with the rear image. As a result, the normal synthesized image is formed as an image in which the area of the rear image is smoothly continuous with the area of the rear-left-side image and the area of the rear right-side image, and is analogous with an image that would be visible were a vehicle occupant of the vehicle 50 directly viewing the rear and the rear sides of the vehicle 50. Accordingly, it is possible to inhibit a peripheral situation outside the vehicle 50 from being misinterpreted by a vehicle occupant who is viewing the normal synthesized image displayed on the display unit 18. Note that the normal synthesized image is an example of a first synthesized image, and steps 100 through 104 are examples of processing corresponding to the display control unit.

Next, in step 106, the electronic mirror ECU 22 determines whether or not a following vehicle 52 (see FIG. 10) is present within a comparatively short distance from the rear of the vehicle 50. Note that the presence of the following vehicle 52 can be determined by analyzing the rear images. For example, it can be determined whether or not the following vehicle 52 is present within a comparatively short distance based on whether or not the size of an image area corresponding to the following vehicle 52 that is contained in the rear image is greater than a predetermined value. In addition, the determination in step 106 can also be made based on detection results from a radar or the like whose range of detection includes the area to the rear of the vehicle 50. In this case, the distance between the vehicle 50 and the following vehicle 52 can be determined more accurately.

If the determination in step 106 is negative, the routine moves to step 108. In step 108, the electronic mirror ECU 22 determines whether or not an object is present within a first blind spot area 80 (see FIG. 4) that does not appear in the normal synthesized image (i.e., is a blind spot). The first blind spot area 80 is created by the deletion of the areas of the rear left-side image and the rear right-side image that overlap on the virtual projection plan 66 with the rear image during the creation of the normal synthesized image.

The determination in step 108 can be achieved by determining whether or not an area corresponding to an object (for example, a two-wheeled vehicle or a person) is present within at least one of the area of the rear left-side image that was deleted during the creation of the normal synthesized image, or the area of the rear right-side image that was deleted during the creation of the normal synthesized image. Note that if an area corresponding to the object is present, then it is also possible to determine whether or not the proportion of this area that is present within the first blind spot area 80 is equal to greater than a predetermined value. Additionally, the determination can also be made based on detection results from a radar or the like whose range of detection includes the area to the rear of the vehicle 50.

If the determination in step 108 is negative, the routine returns to step 100, and steps 100 through 108 are repeated until the determination in either step 106 or step 108 is affirmative. During this time, the creation and display of the normal synthesized image are continued.

Figure 6:
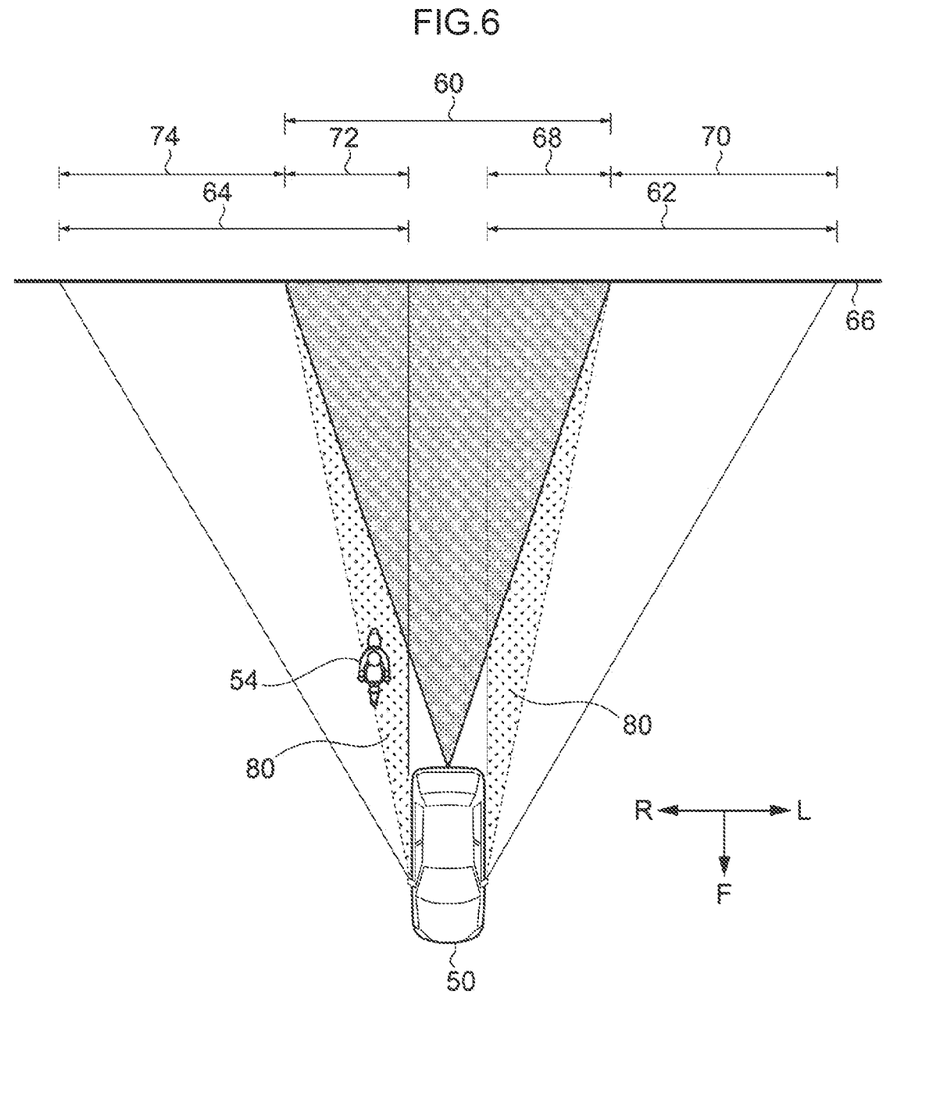
FIG. 6 is a plan view showing an example of a situation in which an object is present within the first blind spot area.

On the other hand, as is shown as an example in FIG. 6, if an object (in the example shown in FIG. 6, this is a two-wheeled vehicle 54) is present in the first blind spot area 80, the determination in step 108 is affirmative, and the routine moves to step 112. As is shown in FIG. 6, if the two-wheeled vehicle 54 is present within the first blind spot area 80, then, as is shown as an example in FIG. 7, the normal synthesized image becomes an image from which a portion of the two-wheeled vehicle 54 is missing. As a result, there is a possibility that the presence of the two-wheeled vehicle 54 will not be recognized by a vehicle occupant who is viewing the image displayed on the display unit 18. Because of this, as is described below, in the steps following step 112, a blind spot priority synthesized image in which an image area corresponding to the two-wheeled vehicle 54 does appear is created and displayed.

If the following vehicle 52 is present within a comparatively short distance from the rear of the vehicle 50, the determination in step 106 is affirmative, and the routine moves to step 110. In step 110, the electronic mirror ECU 22 determines whether or not the object is approaching from the second blind spot area 82 (see FIG. 10). The second blind spot area 82 is generated as a result of the following vehicle 52 being present within a comparatively short distance from the rear of the vehicle 50, and the object that is present within the second blind spot area 82 does not appear in the normal synthesized image (i.e., is in a blind spot).

The determination of step 110 can be achieved by determining whether or not an area corresponding to an object (for example, a two-wheeled vehicle or a person) is present within at least one of the area of the rear left-side image that was deleted during the creation of the normal synthesized image, or the area of the rear right-side image that was deleted during the creation of the normal synthesized image, and, in addition, whether or not the size of this area is increasing over time. Note that the determination can also be made based on detection results from a radar or the like whose range of detection includes the ranges to the rearward sides of the vehicle 50.

Figure 10:
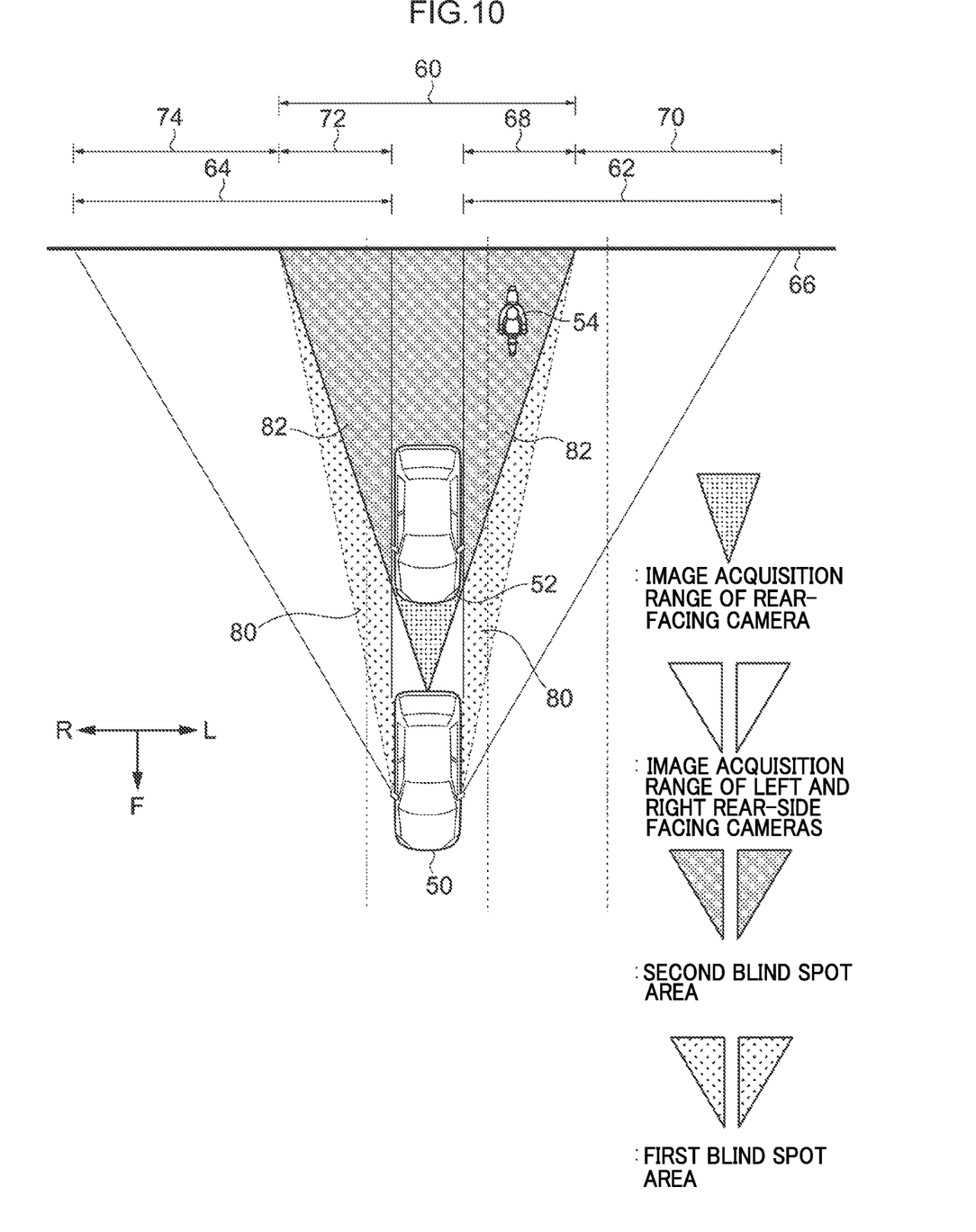
FIG. 10 is a plan view showing an example of a situation in which an object is present within a second blind spot area.
Figure 11:
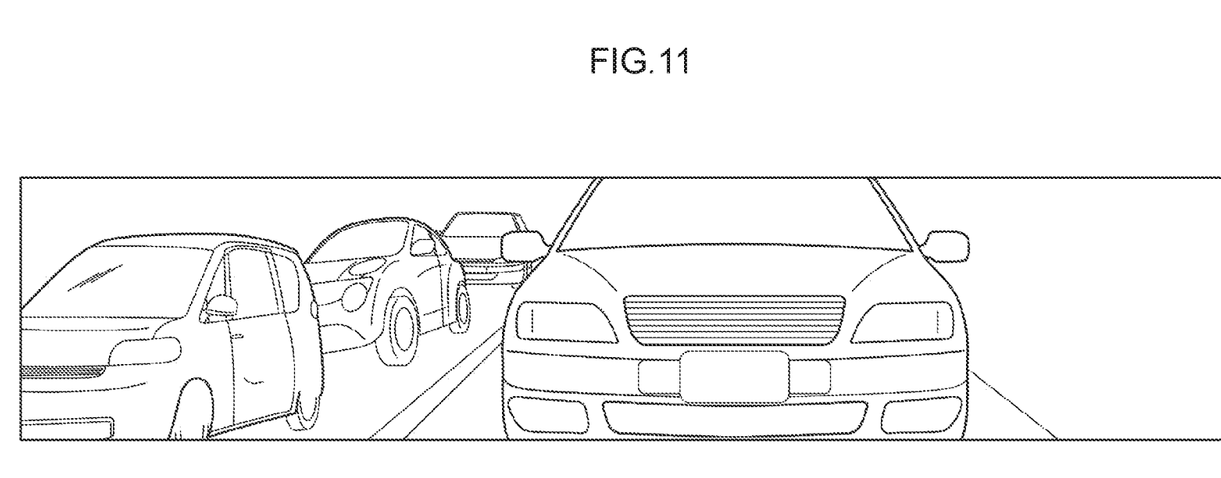
FIG. 11 is an image diagram showing an example of a situation in which an object that is present within a second blind spot area is not displayed on a normal synthesized image.

As is shown as an example in FIG. 10, if an object (in the example shown in FIG. 10, this is the two-wheeled vehicle 54) is present in the second blind spot area 82, then as is shown as an example in FIG. 11, the normal synthesized image becomes an image from which the two-wheeled vehicle 54 is missing. As a result, there is a possibility that the presence of the two-wheeled vehicle 54 which is approaching the vehicle 50 will not be recognized by a vehicle occupant who is viewing the image displayed on the display unit 18. Because of this, when the determination in step 110 as well is affirmative, the routine moves to step 112.

In step 112, the electronic mirror ECU 22 determines whether or not the object present within the first blind spot area 80 or within the second blind spot area 82 is positioned on the rear left side of the vehicle 50. If the determination in step 112 is affirmative, the routine moves to step 114. In step 114, the electronic mirror ECU 22 moves the range over which an image is to be extracted from the rear left-side image towards the right so as to encompass an image area that corresponds to an object that is positioned to the left of the vehicle 50 and is also present within either the first blind spot area 80 or the second blind spot area 82. The electronic mirror ECU 22 then extracts an image from the rear left-side image.

Figure 12:
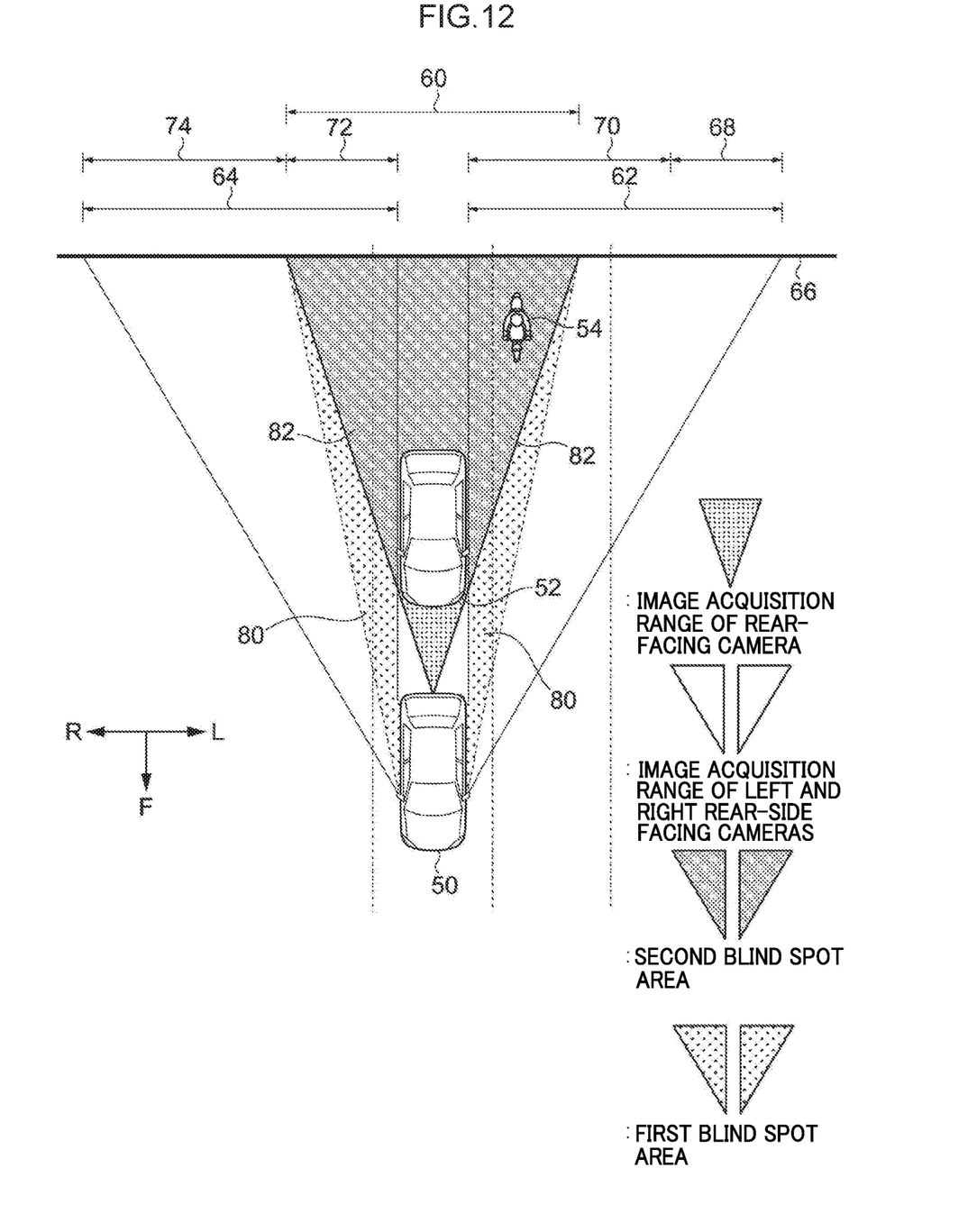
FIG. 12 is a plan view showing an example of an alteration of an extraction range from a rear side-image in a situation in which an object is present within the second blind spot area.

For example, as is shown in FIG. 10 and FIG. 12, if an object (i.e., the two-wheeled vehicle 54) is present within the second blind spot area 82 on the rear left side of the vehicle 50, then as can clearly be seen by comparing FIG. 12 with FIG. 10, the position of the extraction area 70 in the image acquisition range 62 of the rear left-side image is moved towards the right, and the deletion area 68 is moved to the left-end side of the image acquisition range 62. As a result, an image that contains an image area corresponding to an object that is positioned on the rear left side of the vehicle 50 and is also present within either the first blind spot area 80 or the second blind spot area 82 is extracted from the rear left-side image.

If the determination in step 112 is negative, the routine moves to step 116. In step 116, in the same way as when a normal synthesized image is created, the electronic mirror ECU 22 extracts an image from which the area of the rear left-side image that overlaps on the virtual projection plane 66 with the rear image has been deleted. Once the processing of step 114 or step 116 has been performed, the routine moves to step 118.

In step 118, the electronic mirror ECU 22 determines whether or not the object present within the first blind spot area 80 or within the second blind spot area 82 is positioned on the rear right side of the vehicle 50. If the determination in step 118 is affirmative, the routine moves to step 120. In step 120, the electronic mirror ECU 22 moves the range over which an image is to be extracted from the rear right-side image towards the left so as to encompass an image area that corresponds to an object that is positioned to the rear right side of the vehicle 50 and is also present within either the first blind spot area 80 or the second blind spot area 82. The electronic mirror ECU 22 then extracts an image from the rear right-side image.

Figure 8:
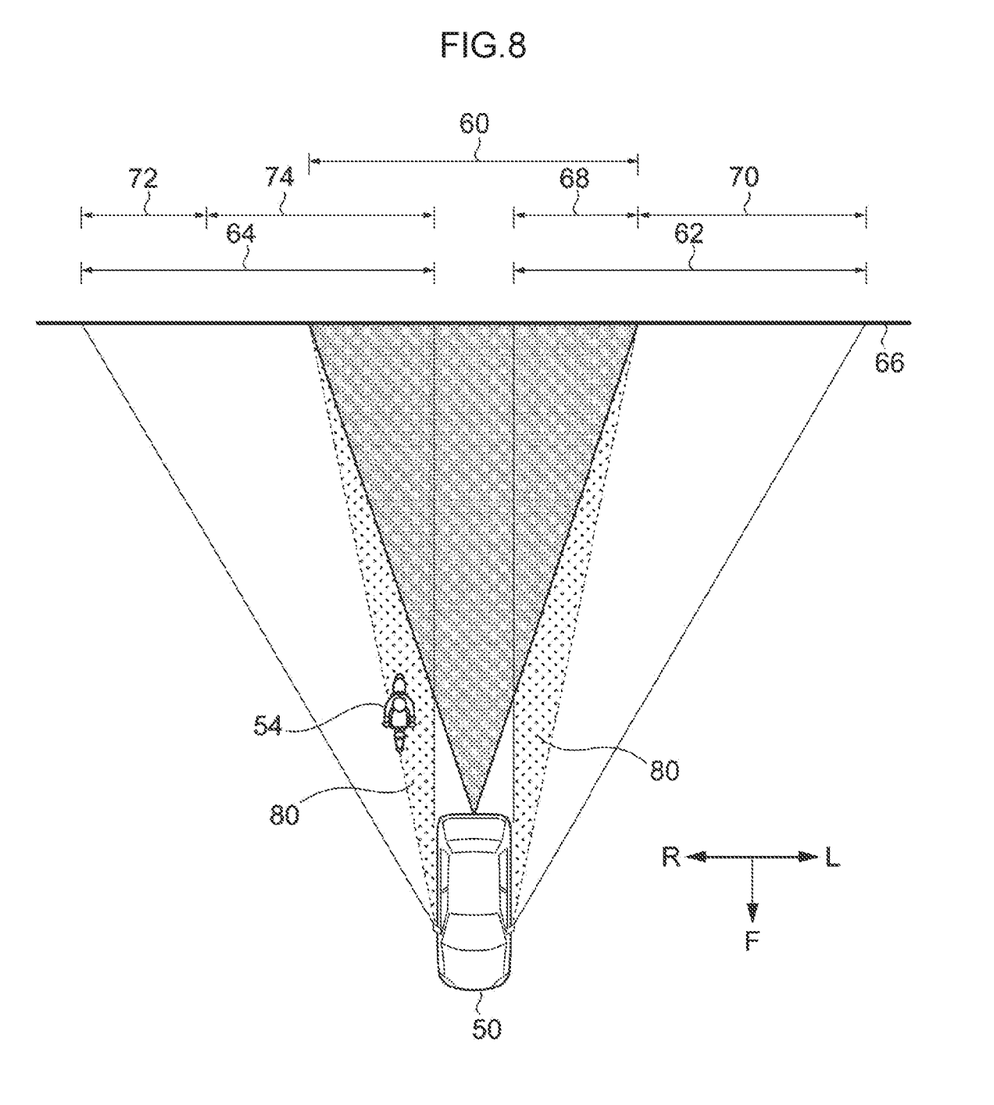
FIG. 8 is a plan view showing an example of an alteration of an extraction range from a rear side-image in a situation in which an object is present within the first blind spot area.

For example, as is shown in FIG. 6 and FIG. 8, if an object (i.e., the two-wheeled vehicle 54) is present within the first blind spot area 80 on the rear right side of the vehicle 50, then as can clearly be seen by comparing FIG. 8 with FIG. 6, the position of the extraction area 74 in the image acquisition range 64 of the rear right-side image is moved towards the left, and the deletion area 72 is moved to the right-end side of the image acquisition range 64. As a result, an image that contains an image area corresponding to an object that is positioned on the rear right side of the vehicle 50 and is also present within either the first blind spot area 80 or the second blind spot area 82 is extracted from the rear right-side image.

If the determination in step 118 is negative, the routine moves to step 122. In step 122, in the same way as when a normal synthesized image is created, the electronic mirror ECU 22 extracts an image from which the area of the rear right-side image that overlaps on the virtual projection plane 66 with the rear image has been deleted. Once the processing of step 120 or step 122 has been performed, the routine moves to step 124.

In step 124, the electronic mirror ECU 22 synthesizes the image extracted from the rear left-side image in step 114 or step 116 with the left side of the rear image, and also synthesizes the image extracted from the rear right-side image in step 120 or step 122 with the right side of the rear image so as to create a blind spot priority synthesized image. Next, in step 126, the electronic mirror ECU 22 causes the blind spot priority synthesized image to be displayed on the display unit 18.

Figure 7:
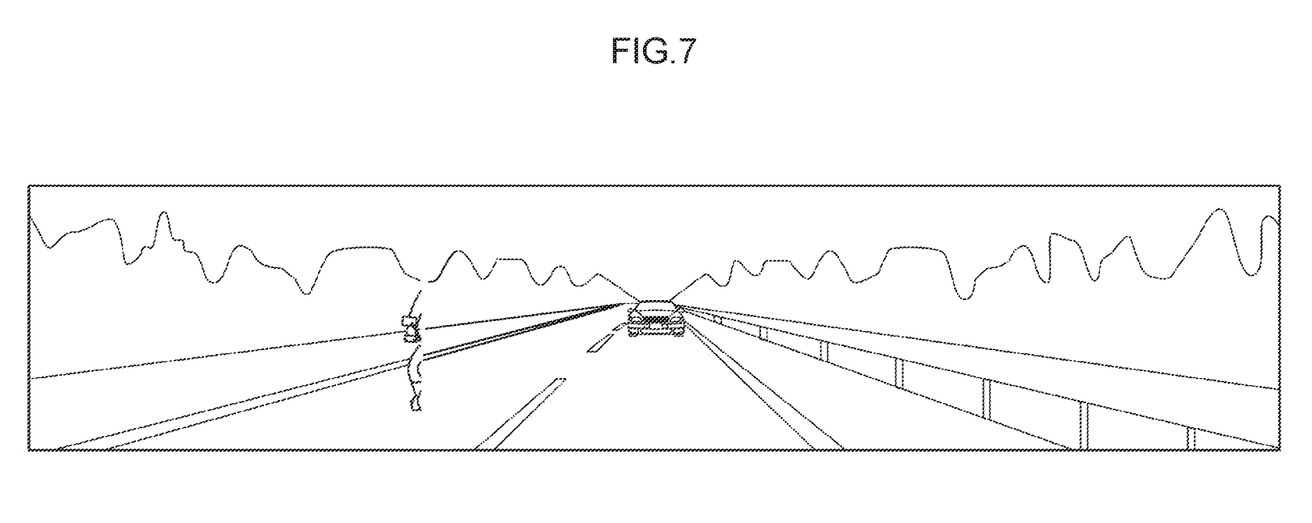
FIG. 7 is an image diagram showing an example of a situation in which a portion of an object present within the first blind spot area is missing from the normal synthesized image.
Figure 9:
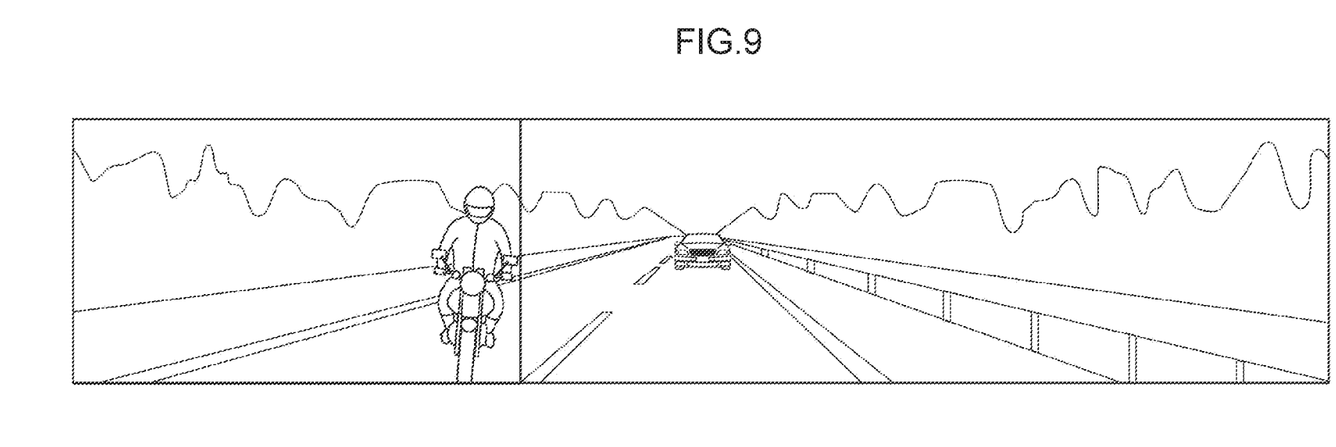
FIG. 9 is an image diagram showing an example of a blind spot priority synthesized image created and displayed in conjunction with the alteration shown in FIG. 8.

As is shown as an example in FIG. 6, if the object (i.e., the two-wheeled vehicle 54 in the example shown in FIG. 6) is present within the first blind spot area 80 on the rear right side of the vehicle 50, then, as is shown as an example in FIG. 7, the normal synthesized image is an image from which a portion of the two-wheeled vehicle 54 is missing. In contrast to this, in the above-described processing, as is shown in FIG. 8, as a result of the position of the extraction area 74 within the image acquisition range 64 of the rear right-side image being moved towards the left, as is shown as an example in FIG. 9, the two-wheeled vehicle 54 appears in the blind spot priority synthesized image that has been created and displayed on the display unit 18. As a result, the presence of the two-wheeled vehicle 54 can be reliably recognized by a vehicle occupant who is viewing the image displayed on the display unit 18.

Figure 13:
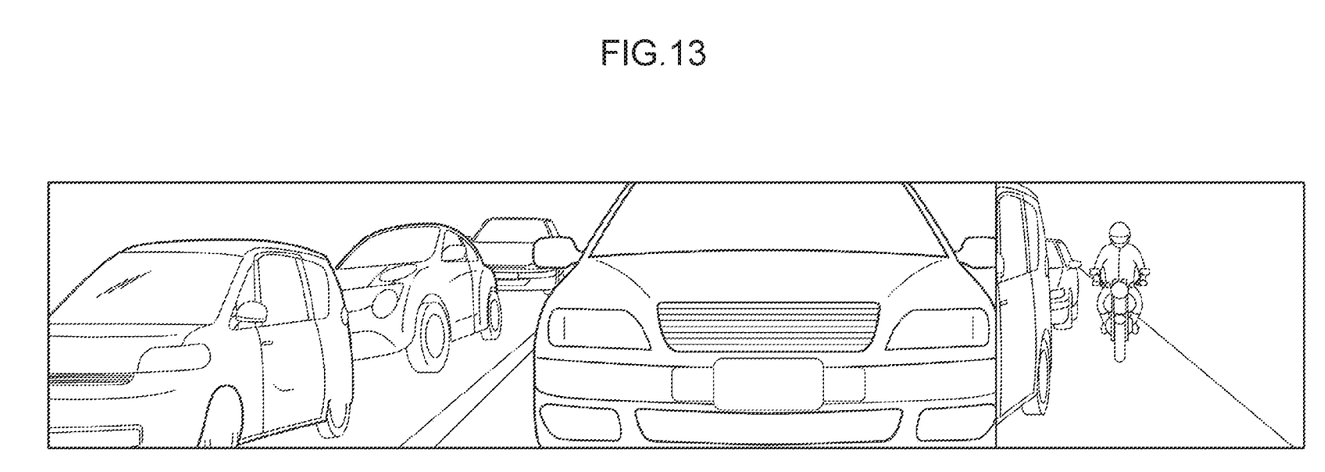
FIG. 13 is an image diagram showing an example of a blind spot priority synthesized image created and displayed in conjunction with the alteration shown in FIG. 12.

Moreover, as is shown as an example in FIG. 10, if the object (i.e., the two-wheeled vehicle 54 in the example shown in FIG. 10) is present within the second blind spot area 82 on the rear left side of the vehicle 50, then, as is shown as an example in FIG. 11, the normal synthesized image is an image in which the two-wheeled vehicle 54 does not appear. In contrast to this, in the above-described processing, when the two-wheeled vehicle 54 has approached close to the vehicle 50, as is shown in FIG. 12, as a result of the position of the extraction area 74 within the image acquisition range 62 of the rear left-side image being moved towards the right, as is shown as an example in FIG. 13, the two-wheeled vehicle 54 appears in the blind spot priority synthesized image that has been created and displayed on the display unit 18. As a result, the presence of the two-wheeled vehicle 54 approaching the vehicle 50 from the rear right side of the vehicle 50 can be reliably recognized by a vehicle occupant who is viewing the image displayed on the display unit 18.

Once the processing of step 126 has ended, the routine moves to step 128. In step 128, the electronic mirror ECU 22 determines whether or not the object present within the first blind spot area 80 or the second blind spot area 82 has disappeared from within the first blind spot area 80 or the second blind spot area 82. If the determination in step 128 is negative, the routine returns to step 106. The creation and displaying of the blind spot priority synthesized image is then continued by repeating steps 106 through 128 until either the determination in step 108 is negative or the determination in step 128 is affirmative. Once the determination in step 108 is negative or the determination in step 128 is affirmative, the routine returns to step 100, and the processing returns to a state of creating and displaying a normal synthesized image.

In this way, in the present exemplary embodiment, a blind spot priority synthesized image is created when an object is present within the first blind spot area 80, and when an object present within the second blind spot area 82 is approaching the vehicle 50. The blind spot priority synthesized image is an image in which a rear side-image containing an image area that corresponds to an object present within either the first blind spot area 80 or the second blind spot area 82 is superimposed on the rear image, and the image displayed on the display unit 18 is switched from the normal synthesized image to the blind spot priority synthesized image.

Consequently, by viewing the blind spot priority synthesized image in which the image area corresponding to an object present within either the first blind spot area 80 or the second blind spot area 82 appears, a viewer of the display image can be made to recognize the peripheral situation outside the vehicle, namely, a situation in which an object is present within the first blind spot area 80, or a situation in which an object that is present within the second blind spot area 82 is approaching the vehicle 50. Moreover, because the switching of the image displayed on the display unit 18 from the normal synthesized image to the blind spot priority synthesized image is only performed when an object is present within the first blind spot area 80, and when an object present within the second blind spot area 82 is approaching the vehicle 50, the frequency with which the image displayed on the display unit 18 is switched is reduced. As a consequence, it is possible to inhibit a viewer of the display image from feeling that the switching of the images is too complex, and from misinterpreting the peripheral situation outside the vehicle.

Note that, in the above description, an aspect is described in which the creation of a blind spot priority synthesized image in which an image area corresponding to an object present within either the first blind spot area 80 or the second blind spot area 82 appears is achieved by moving the extraction areas 70 and 74 of the rear side-images that are superimposed onto the rear image, however, the present disclosure is not limited to this. For example, it is also possible to create a blind spot priority synthesized image by compressing the rear side-images in the vehicle width direction such that they are superimposed onto the rear image, so as to thereby broaden the range of the image that corresponds to the extraction area of the rear side-images as far as a range in which an image area corresponding to an object present within either the first blind spot area 80 or the second blind spot area 82 appears.

In addition, in the above description, an aspect is described in which a blind spot priority synthesized image is created and displayed when an object that is present within the second blind spot area 82 is approaching the vehicle 50, however, the present disclosure is not limited to this. For example, if an object is present within the second blind spot area 82, then it is also possible for a blind spot priority synthesized image to be created and displayed irrespective of whether or not this object is approaching the vehicle 50.

What is claimed is:

1. A peripheral display device for a vehicle, comprising:
a rear-facing image acquisition unit that acquires a rear image of a rear of a vehicle;
rear-side facing image acquisition units that acquire rear side-images of areas to rearward sides of the vehicle;
a display control unit that creates a first synthesized image by synthesizing the rear image acquired by the rear-facing image acquisition unit with the rear side-images acquired by the rear-side facing image acquisition units, and then displays the first synthesized image on a display unit; and
a switching unit that, when an object is present within an image acquisition range of the rear-side facing image acquisition units and is also within a first blind spot area that does not appear in the first synthesized image, and when, due to an approach of another vehicle from the rear of the vehicle, an object is present within the image acquisition range of the rear-side facing image acquisition units and is also within a second blind spot area that does not appear in the first synthesized image, creates a second synthesized image in which a rear side-image that includes an image area corresponding to the object is superimposed onto the rear image, and switches the image displayed on the display unit to the second synthesized image, wherein
a portion of the image acquisition ranges of the rear-facing image acquisition unit and the rear-side facing image acquisition units mutually overlap,
the display control unit creates the first synthesized image by firstly deleting areas of the rear side-images that overlap with the rear image on a virtual projection plane, and then synthesizing remaining areas of the rear side-images with the rear image, and
the switching unit creates the second synthesized image in which the image area appears by compressing the rear side-images in the vehicle width direction such that a range of the rear side-images that is superimposed onto the rear image contains the image area.

2. The peripheral display device for a vehicle according to claim 1, wherein the switching unit performs the creation of the second synthesized image and the displaying of the second synthesized image on the display unit that are performed when an object is present within the second blind spot area, when the object is approaching the vehicle.

3. The peripheral display device for a vehicle according to claim 1, wherein the peripheral display device for a vehicle is an electronic mirror device that is mounted on the vehicle.

* * * * *